United States Patent [19]

Elhardt

[11] Patent Number: 5,347,289
[45] Date of Patent: Sep. 13, 1994

[54] METHOD AND DEVICE FOR MEASURING THE POSITION AND ORIENTATION OF OBJECTS IN THE PRESENCE OF INTERFERING METALS

[75] Inventor: Scott T. Elhardt, Maple Grove, Minn.

[73] Assignee: Honeywell, Inc., Minneapolis, Minn.

[21] Appl. No.: 84,831

[22] Filed: Jun. 29, 1993

[51] Int. Cl.$^5$ ............................................. G01S 5/04
[52] U.S. Cl. ................... 342/448; 364/559
[58] Field of Search ............... 342/448, 451; 340/870.32; 364/559; 324/226, 207.25

[56] References Cited

U.S. PATENT DOCUMENTS

| | | |
|---|---|---|
| 4,017,858 | 4/1977 | Kuipers . |
| 4,287,809 | 9/1981 | Egli et al. . |
| 4,333,154 | 6/1982 | Devaud et al. . |
| 4,396,885 | 8/1983 | Constant . |
| 4,550,984 | 11/1985 | Reymond . |
| 4,768,028 | 8/1988 | Blackie . |
| 4,829,250 | 5/1989 | Rotier . |
| 4,849,692 | 7/1989 | Blood . |

Primary Examiner—Theodore M. Blum
Attorney, Agent, or Firm—Craig J. Lervick

[57] ABSTRACT

A method of measuring the position and orientation of an object is disclosed in conjunction with an apparatus to achieve this method. The method and apparatus reduce the metal effects caused by metal objects which are in close proximity to a magnetic field generator. The metal effects are reduced by utilizing a magnetic field generator which creates a rotating magnetic field vector and then measuring the time required for that magnetic field vector to travel between a known reference point and the sensor whose position is being measured. By keeping the frequency of the rotating magnetic field vector constant and measuring the time required for this magnetic field vector to travel the previously mentioned distance, an angle between a reference axis and a vector directed toward the sensor can be determined. Once appropriate angles are measured, calculations can be undergone to determine the position of the sensor. Furthermore, by utilizing a plurality of sensors the orientation of the sensors with respect to one another can be determined.

27 Claims, 9 Drawing Sheets

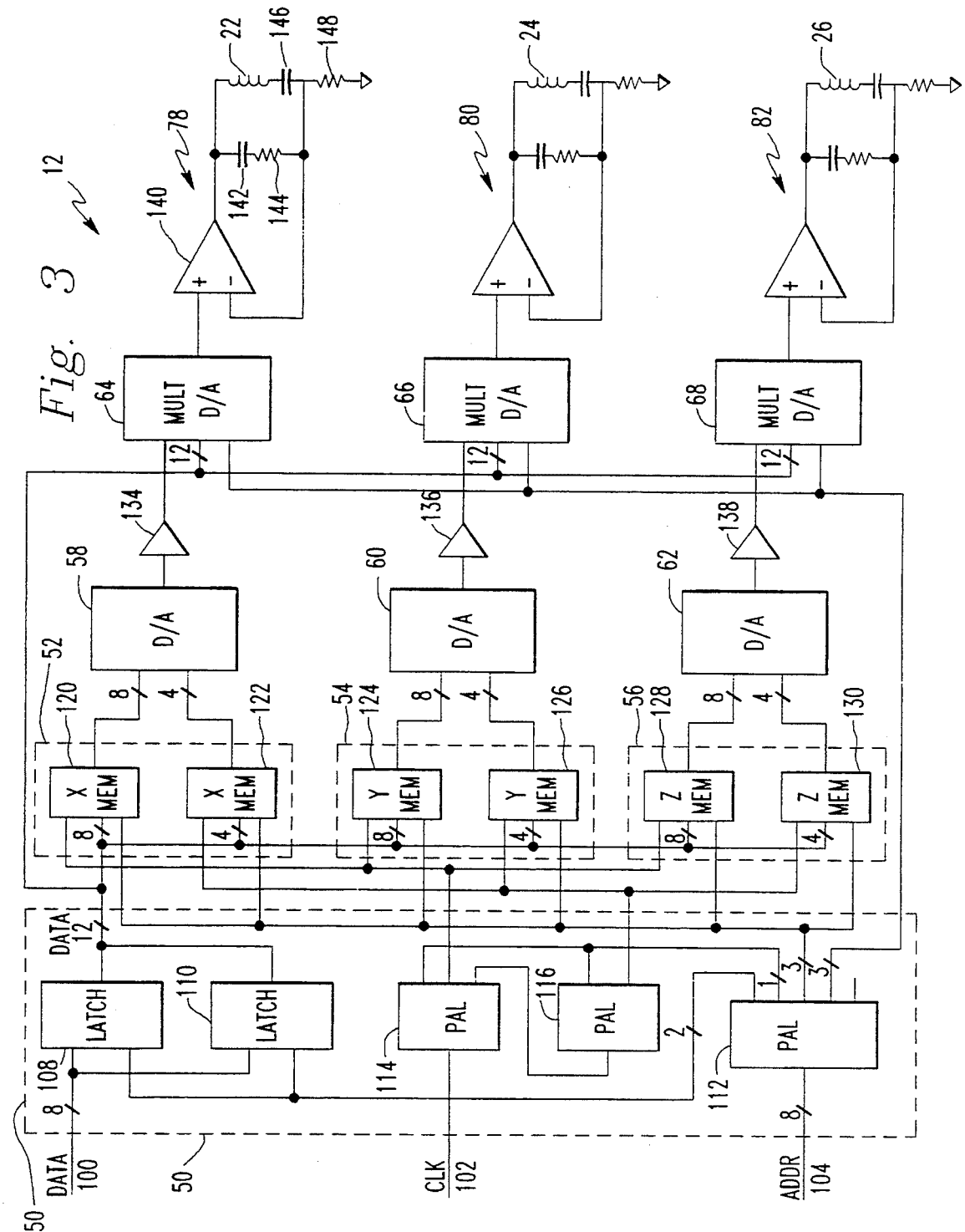

METHOD AND DEVICE FOR MEASURING THE POSITION AND ORIENTATION OF OBJECTS IN THE PRESENCE OF INTERFERING METALS

FIELD OF THE INVENTION

The present invention relates to a method and apparatus for determining the position of an unattached sensor in free space. More specifically, the invention relates to a device and method of determining the position and orientation of a line of sight device, such as a targeting device used by the pilot of an aircraft.

BACKGROUND OF THE INVENTION

Determining the position and orientation of objects in free space has many applications. Specific applications include targeting systems used in conjunction with various aircraft, computer peripherals which utilize the position sensing apparatus to position a cursor, and many other pointing applications. Generally, either a single sensor or a plurality of sensors are attached to a device such as a helmet and the position of those sensors is determined relative to known reference points. In an aircraft targeting application, a plurality of sensors are placed in a pilot's helmet and the position of those sensors is determined. Knowing the position of the plurality of sensors, the orientation of the pilot's helmet can be calculated in relation to a reference axis of the aircraft. The orientation of the pilot's helmet can then be used to direct certain devices in the same general direction as the pilot's line of sight.

One prior approach to determining the position and orientation of an object is to utilize magnetic transmitters and receivers. Typically, a magnetic signal is transmitted of a known value from a known reference point. Receivers, or sensors, placed in free space sense the magnetic signal and the position of the receiver is calculated based on the magnitude and direction of the sensed magnetic field signal. The receivers used in this type of application are three axis magnetic sensors which can detect three orthogonal components of a magnetic field.

When these magnetic transmitters and sensors are utilized in an aircraft cockpit, adjustments must be made to account for the large amounts of metal in the area. The presence of a metal object in close proximity to the magnetic transmitter can seriously alter the strength and uniformity of a magnetic field. Since large amounts of metals exist on an aircraft, eddy currents in the metal produce magnetic fields which distort any transmitted magnetic fields at all points in the cockpit. Due to these eddy currents, signals received by the sensor are not true indications of position. These metal effects produce serious errors when trying to determine the position and orientation of sensors within a cockpit.

One solution to the problem of metal effects has been to map the area involved. More specifically, measurements are made in the cockpit wherein a known signal is generated and the sensor is positioned at a known position, resulting in a sensor signal. This sensor signal is then stored and the characteristics of the magnetic field within the entire cockpit are thus determined. Once the magnetic field characteristics are determined, the errors due to metal effects can thus be accounted for.

Another solution to the problem of metal effects is to utilize optical signals rather than magnetic signals. In this application an optical signal is generated from a known point within the cockpit and an optical sensor receives the optical signal. Several disadvantages are inherent in the use of optical signals. One disadvantage is the necessity to have a free path between the sensor and transmitter. Any object placed between the transmitter and the receiver will render the device inoperable and ineffective. Furthermore, the receivers will have a limited field of operation. For example, when an optical signal is placed directly behind the pilot's head and the optical sensor is placed directly on the back of the pilot's helmet, should the pilot turn his head too far the optical signal will not be received. Thus, there is a need for multiple optical sensors and multiple optical signal sources.

SUMMARY OF THE INVENTION

The present invention makes use of magnetic fields to detect the position and orientation of a sensor. Magnetic fields can be projected through certain objects and certain materials, thus do not require a clear path between the transmitter and sensor. Furthermore, magnetic field transmitters and sensors can be better protected through appropriate shielding and protection.

To reduce the metal effects which degrade the accuracy of a system utilizing magnetic fields, the present invention creates a rotating magnetic field vector as its probe signal rather than a uniform magnetic field. This magnetic field vector is rotated at a predefined frequency. A measurement is made of the time period required for the magnetic field vector to pass through a known reference point and the point at which the magnetic field vector encounters the sensors. By knowing the time required for the rotating magnetic field vector to travel between the known reference point and the sensor and by also knowing the frequency of the rotating magnetic field vector, an angle can be determined between a known reference vector and a position vector which extends from the transmitter directly to the sensor.

In the present invention a three-axis magnetic transmitter is utilized, thus allowing the capability of creating rotating magnetic field vectors about three orthogonal axis. By measuring angles with respect to the three orthogonal axis, the position of the sensor can then be determined with reference to the transmitter.

The present invention uses an orthogonal three axis magnetic field sensor. By taking the output from each axis of the three-axis magnetic field sensor and performing a root sum of squares operation upon the three outputs, a signal is created which indicates when the rotating magnetic field vector has encountered the sensor.

The magnetic field sensor is only concerned in determining the time at which the rotating magnetic field vector encounters the sensor. Consequently, the magnetic field sensor is not as concerned with the amplitude or orientation of any magnetic field's detected. By performing a root sum of squares operation upon the three orthogonal outputs, a wave form is generated which indicates the time at which the rotating magnetic field vector encounters the sensor. A root sum of squares signal is utilized because of its sensitivity to amplitudes received and its lesser sensitivity to noise.

Because the present invention is less effected by the magnitude of magnetic field signals which are sensed by the magnetic field sensor, this method of position sensing is less susceptible to metal effects.

By using a plurality of sensors and determining the relative position of each of these sensors with respect to the magnetic field transmitter, the orientation of the sensors can thus be calculated. All of these positions and orientations are calculated based upon relative angles measured. The determination of position and orientation using such angles requires fewer calculations and reduces the complexity of calculations.

It is an object of the present invention to create a device for measuring position and orientation of objects which is less sensitive to eddy currents and metal effects.

It is a further object of the present invention to provide a method of position determination having reduced complexity of calculations and reduced magnitude of calculations.

BRIEF DESCRIPTION OF THE DRAWINGS

Further objects and advantages of the present invention can be seen by reading the following detailed description in conjunction with the drawings in which:

FIG. 3 is a schematic diagram of the signal generator used to drive the magnetic field transmitter of the present invention;

DETAILED DESCRIPTION OF THE INVENTION

The present invention provides a method and apparatus to determine the position and orientation of objects in free space. More specifically, the present invention utilizes a multiple axis magnetic field transmitter in conjunction with a plurality of magnetic sensors to determine the position and orientation of a pilot's helmet with the cockpit of an aircraft. The plurality of sensors are connected to the helmet at a known distance and orientation from one another. By determining the position of each of these sensors, the position and orientation of the helmet can also be determined. This positioning and orientation of the pilot's helmet can then be used to control other devices, such as armaments, vision enhancing devices and navigation equipment.

Figure 1:
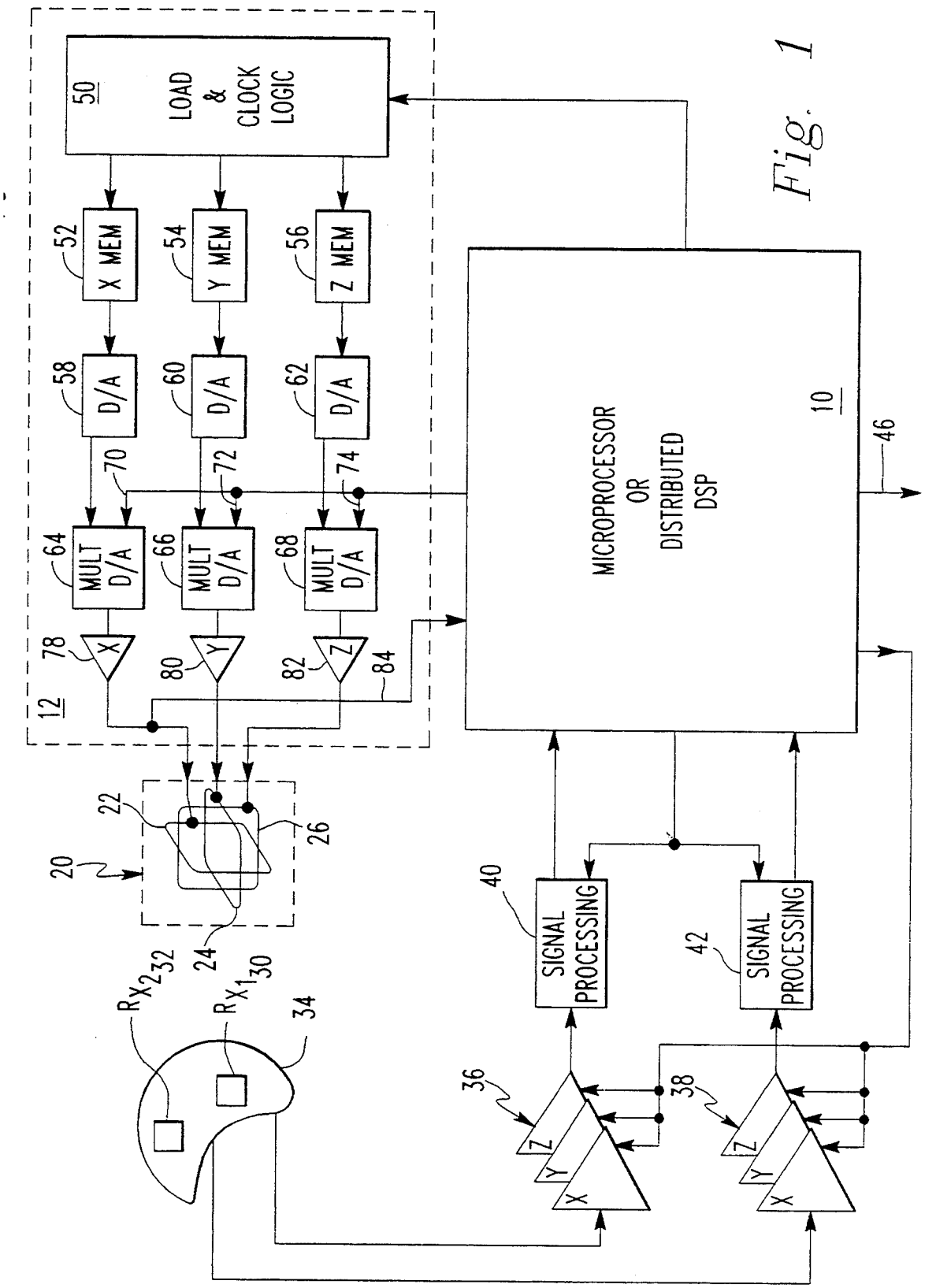
FIG. 1 is a block diagram of the system implementing the present invention.

Referring now to FIG. 1, there is shown a block diagram of a system which implements the concepts of the present invention. The transmission and receipt of magnetic field signals is controlled by a microprocessor or a distributed digital signal processor 10. Microprocessor 10 communicates with a drive signal generator 12 which generates appropriate signals to drive a magnetic field transmitter 20. As seen in FIG. 1, transmitter 20 comprises three orthogonal coils: an X-coil 22, a Y-coil 24, and a Z-coil 26.

Transmitter 20 creates the appropriate rotating magnetic field vectors which are thus received by a first receiver, or sensor, 30 and a second receiver, or sensor, 32. As previously mentioned, first receiver 30 and second receiver 32 are attached to a pilot's helmet 34. These signals received by first receiver 30 and second receiver 32 are transmitted to a first amplifying network 36 and a second amplifying network 38. First amplifying network 36 and second amplifying network 38 produce amplified outputs which are then fed to a first signal processing stage 40 and a second signal processing stage 42, respectively. First signal processing stage 40 has an output which is transmitted back to microprocessor 10. Similarly, second signal processing stage 42 has an output which is also transmitted back to microprocessor 10. Microprocessor 10 can then calculate the appropriate angles for each of the signal sets received. Information regarding position and orientation of first sensor 30 and second sensor 32 and furthermore, position an orientation of the helmet can then be transmitted to peripheral devices from microprocessor 10 via an output 46.

Referring more specifically to drive signal generator 12, all necessary elements are included to allow differing signals to be loaded into a memory and to subsequently drive transmitter 20 consistent with the loaded signals. Microprocessor 10 provides signals to a load and clock logic device 50 which contains the necessary logic to load wave forms into memory or alternatively, to trigger and generate wave forms from memory. Attached to load and clock logic device 50 is an X-memory 52, Y-memory 54 and Z-memory 56. X-memory 52 is capable of storing appropriate signals which will subsequently be transmitted to the X-coil 22 of transmitter 20. Similarly, Y-memory 54 contains the signal to be transmitted to the Y-coil 24 and Z-memory 56 contains the signals to be transmitted to the Z-coil 26. Attached to an output of X-memory 52 is a digital to analog (D to A) converter 58. Similarly, connected to the output of Y-memory 54 is a second digital to analog (D to A) converter 60. Lastly, connected to an output of Z-memory 56 is a third digital to analog (D to A) converter 62. First D to A converter 58, second D to A converter 60, and third D to A converter 62 are all used to convert signals stored in their attached memories to an analog signal. The output of first D to A converter 58 is transmitted to a first input of a first multiplying D to A converter 64. Second D to A converter 60 is connected to second multiplying D to A converter 66 and third D to A converter 62 is connected to third multiplying D to A converter 68. Each multiplying D to A converter 64, 66 and 68 have a second input 70, 72 and 74, which are all connected to microprocessor 10. These D to A second inputs 70, 72 and 74, allow the microprocessor to dynamically adjust the magnitude of these signals being transmitted to each of the coils of transmitter 20. This adjustment is necessary due to non-uniformity to the three orthogonal coils in transmitter 20 and to adjust gain as a function of the separation between transmitter 20 and receiver (either first receiver 30 or second receiver 32). Multiplying D to A converter 64 has an output which is connected to an X-drive amplifier 78. X-drive amplifier 78 provides the necessary amplification and current necessary to drive the X-coil 22 of transmitter 20. Similarly, second multiplying D to A converter 66 has an output connected to a Y-drive amplifier 80 which is used to drive the Y-coil 24 of transmitter 20. Lastly, third multiplying D to A converter has an output which is attached to a Z-drive amplifier 82 which provides the necessary amplification to drive the Z-coil 26 of transmitter 20. Attached to the output of X-drive amplifier 78 is a sampling connection 84 connected to microprocessor 10. Sampling connection 84 is used to transmit a reference signal to microprocessor 10. It will be understood by those skilled in the art that sampling connection 84 could be connected to the output of Y-drive amplifier 80 or the output of Z-drive amplifier 82, or any combination thereof.

Figure 4:
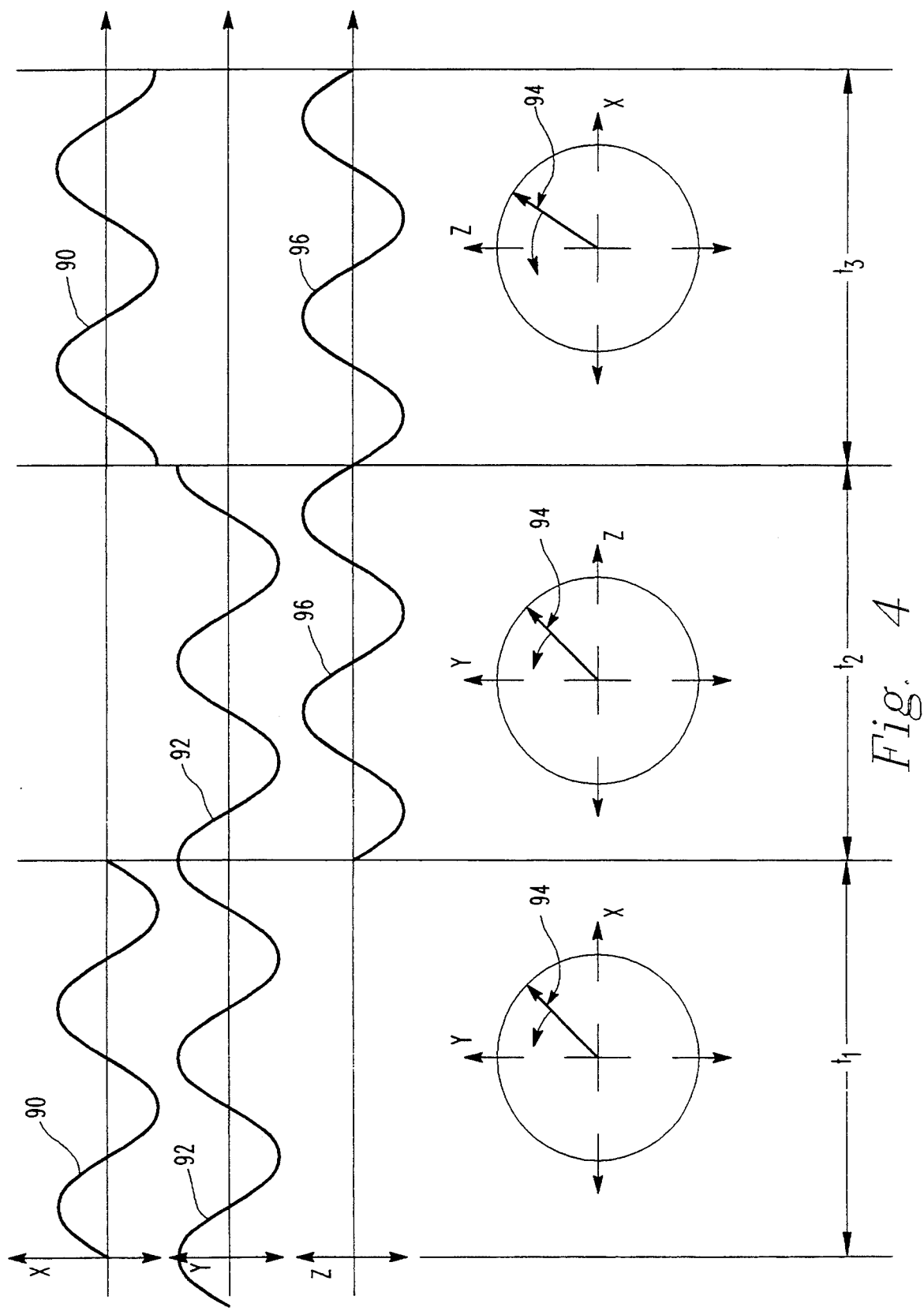
FIG. 4 is a graph showing one scheme to generate the necessary magnetic fields.

As previously mentioned, transmitter 20 has three separate coils arranged orthogonally. These coils can be separately energized to create a magnetic field having the desired characteristics. Referring now to FIG. 4, there are shown appropriate wave forms to create the desired rotating magnetic field vector. This illustration graphically shows the wave forms directed to each orthogonal coil, thus resulting in a rotating magnetic field vector.

Shown at time period $t_1$ are the necessary drive signals to create a rotating magnetic field vector which will rotate about the Z-axis. As shown in FIG. 4, X-drive amplifier 78 outputs a sinusoidal signal 90 while Y-drive amplifier 80 outputs a second sinusoidal signal 92. By having X-sinusoidal signal 90 an Y-sinusoidal 92 phased 90 degrees apart, the resulting magnetic field vector 94 will rotate in free space around the Z-axis.

During time period $t_2$, Y-drive amplifier 80 outputs a similar sinusoidal signal 92 to the Y-coil 24, while Z-coil amplifier 82 outputs a Z-sinusoidal signal 96. During time period $t_2$, Y-sinusoidal signal 92 and Z-sinusoidal signal 96 are phased 90 degrees apart, again resulting in a rotating magnetic field vector 94 which will rotate about the X-axis. Lastly, during time period $t_3$ X-drive amplifier 78 outputs X-sinusoidal signal 90 to X-coil 22 while Z-drive amplifier 82 outputs Z-sinusoidal signal 96 to Z coil 26. During time period $t_3$, Z-sinusoidal signal 96 and X sinusoidal signal 90 are arranged to be phased 90 degrees apart, again resulting in magnetic field vector 94 to rotate about the Y-axis.

In summary, by applying the correct voltage signals to X-coil 22, Y-coil 24 and Z-coil 26, a magnetic field vector can be obtained which will rotate about the appropriate axis. It is important to note that the X-sinusoidal signal 90, Y-sinusoidal signal 92 and Z-sinusoidal signal 96 are all of the same frequency, thus creating a magnetic field vector that will rotate at that same frequency. By holding this frequency constant it is known that magnetic field vector 94 will rotate a certain amount in a given period of time.

Figure 2A:
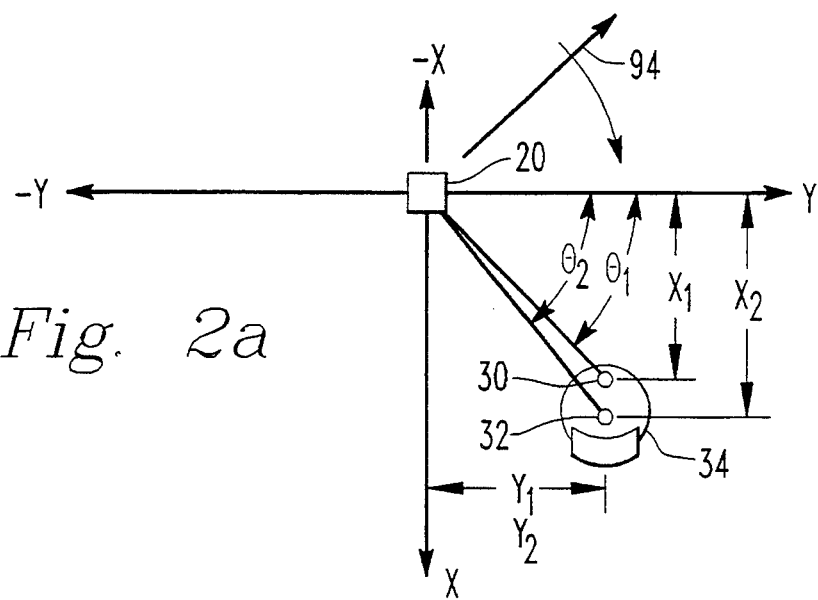
FIG. 2 is an illustration of the method of the present invention used to determine the position and orientation of the two magnetic field sensors which are attached to a pilot's helmet.
Figure 2B:
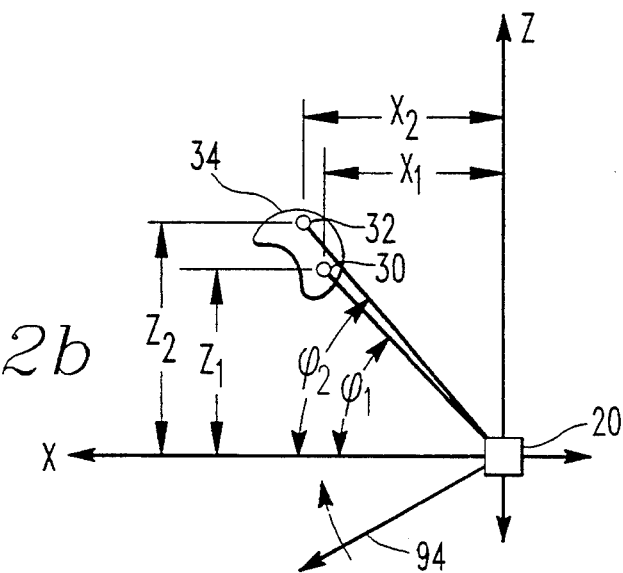
Figure 2C:
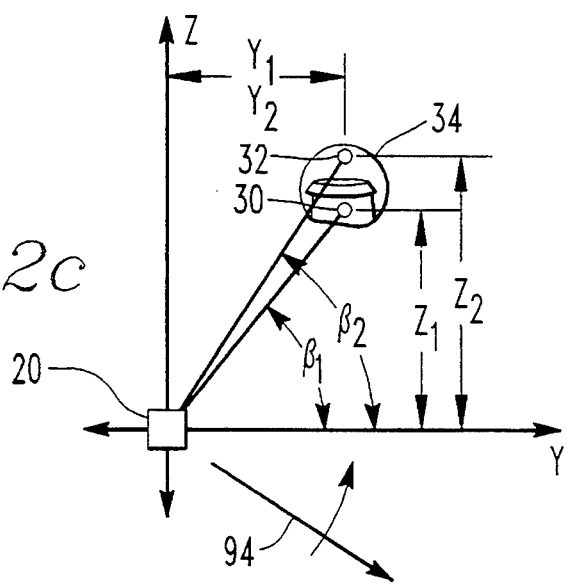

Referring now to FIGS. 2a, 2b and 2c, there is shown a graphical illustration which helps to explain how the measured angles are used to determine the position in orientation of a pilot's helmet. As shown in FIG. 2a, transmitter 20 is positioned at a known reference point and oriented along an X and Y-axis. By appropriately driving X-coil 22 and Y-coil 24, a rotating magnetic field vector is created which rotates about the Z-axis (into the page). Shown in FIG. 2a, rotating magnetic field vector 94 rotates in a clockwise direction. The positive Y-axis is arbitrarily chosen as a reference point and the time required for rotating magnetic field vector 94 to travel between the Y-axis and first sensor 30 is measured. Similarly, the time required for rotating magnetic field vector 94 to travel between the Y-axis and second sensor 32 is also measured. From these time measurements and the frequency of rotating magnetic field vector 94, angles $\theta_1$ and $\theta_2$ can be determined.

FIG. 2b shows a similar diagram having rotating magnetic field vector 94 rotating about the Y-axis. In FIG. 2b rotating magnetic field vector is shown to rotate in a counterclockwise direction. Here the X-axis is chosen as a reference point and the time required for rotating magnetic field vector 94 to travel between reference X-axis and first sensor 30 is determined. Similarly, the time required for rotating magnetic field vector to travel between reference X-axis and second sensor 32 is also determined. Again, from these time measurements and the frequency of rotating magnetic field vector 94, the angles $\phi_1$ and $\phi_2$ can be determined.

Lastly, FIG. 2c illustrates the rotating magnetic field vector 94 traveling in a counter clockwise direction around the X-axis. Here the Y-axis is chosen as a reference and the time period required for rotating magnetic field vector 94 to travel between the Y-axis and first sensor 30 is measured. Similarly, the time required for rotating magnetic field vector 94 to travel between the Y-axis and second sensor 32 is also measured. From these time measurements, the angles $\beta_1$ and $\beta_2$ can be determined.

As will be recognized by those skilled in the art, once all of the necessary angles are measured the position with reference to transmitter 20 of first sensor 30 and second sensor 32 can easily be determined. It will be noted that there are many methods of determining this position, all of which shall function equally as well. Thus, a position of first sensor 30 having coordinates X1, Y1, Z1 and the position of second sensor 32 having coordinates X2, Y2 and Z2 are known. By knowing the distance and orientation of the sensors 30 and 32 with respect to one another, the position and orientation of the helmet can then be determined.

It will be further recognized that the position and orientation of a pilot's helmet can also be determined using different combinations of hardware. One alternate embodiment of the present invention utilizes three receivers attached to the pilot's helmet and utilizes only two rotating magnetic field vectors. Transmitter 30 is driven by microprocessor 10 which allows the capability to generate many different types of magnetic signals, including rotating magnetic field vectors in either two or three axes.

Referring now to FIG. 3, there is shown a more detailed schematic diagram of drive signal generator 12. Drive signal generator 12 receives numerous signals from microprocessor 10. Specifically, drive signal generator 12 receives a data signal 100, a clock signal 102, and an address signal 104. These inputs (data line 100, clock signal 102, and address line 104) allow microprocessor 10 to load particular waveforms into signal generator memory and to trigger those waveforms, resulting in the generation of appropriate signals being sent to the three coils 22, 24 and 26 of transmitter 20.

Load and clock logic device 50 contains a first latch 108 and a second latch 110. The use of two latches allows data received on data line 100 (which is 8 bits wide) to be combined to provide a 12 bit data signal out of a combination of first latch 108 and second latch 110. The data output from the two latches, 108 and 110, is then transmitted to either X-memory 52, Y-memory 54 or Z-memory 56.

Signals received on generator address line 104 are input to a programmable array logic device (PAL) 112. First PAL 112 is used for address steering to direct signals to the correct memory blocks.

Clock signal 102 is input to a second PAL 114. Second PAL, in conjunction with a third PAL 116, is used to coordinate the timing of data transfers.

Shown in FIG. 3, X-memory 52 contains two 8 bit memory blocks, a first X-memory block 120 and a second X-memory block 122. Similarly, Y-memory 54 contains a first Y-memory block 124 and a second Y-memory block 126; and lastly, Z-memory 56 contains a first Z-memory block 128 and a second Z-memory block 130.

X-memory 52, Y-memory 54 and Z-memory 56 all contain two individual memory blocks to allow the handling of 12 bits of data while utilizing 8 bit memory devices. Each of the memory blocks, 120, 122, 124, 126, 128 and 130 all have the necessary data lines and addressing lines attached thereto to allow manipulation of 12 bits of data.

X-memory 52 outputs a signal to first D to A converter 58. Similarly, Y-memory 54 outputs to second D to A converter 60 while Z-memory 56 outputs to third D to A converter 62. Each of these D to A converters 58, 60, 62 are used to convert the digital signals stored in memory to analog signals. The appropriate analog signal is then output to a subsequent device.

The first D to A converter 58 outputs its analog output to an X-buffer amplifier 134, which then transmits the analog signal to first multiplying D to A converter 64. Similarly, the second D to A converter 60 has its analog output connected to a Y-buffer amplifier 136 which then transmits an analog signal to second D to A converter 66. Lastly, the third D to A converter 62 has its output connected to a Z-buffer amplifier 138 which then transmits an analog signal to third multiplying D to A converter 68.

First multiplying D to A converter 64 receives the analog signal from X-buffer amplifier 34 along with an address signal from first PAL 112 and a data signal from first latch 108 and second latch 110. The address signal from PAL 112 and the data signal from latches 108 and 110 allow microprocessor 10 to adjust the level of analog signals being transmitted from X-buffer amplifier 134. This allows the first multiplying D to A converter 64 to dynamically adjust its output as necessary.

First multiplying D to A converter 64 supplies its output to X-drive amplifier 78. X-drive amplifier 78 consists of an operational amplifier and power driver 140 having its output connected to X-coil 22. Also connected at the output of operational amplifier 140 is a filtering configuration having a first capacitor 142 and a resistor 144. Capacitor 142 and resistor 144 are connected in a negative feedback configuration to allow appropriate filtering of operational amplifier 140 output. Also connected in series with X-coil 22 is a second filtering capacitor 146 in conjunction with a load resistor 148.

Second multiplying D to A converter 66 and third multiplying D to A converter 68 are configured the same as first multiplying D to A converter 64. Their outputs are connected to Y-drive amplifier 80 and B drive amplifier 82, respectively. Y-drive amplifier 80 and Z-drive amplifier 82 are configured similarly to that of X-drive amplifier 78.

Figure 5:
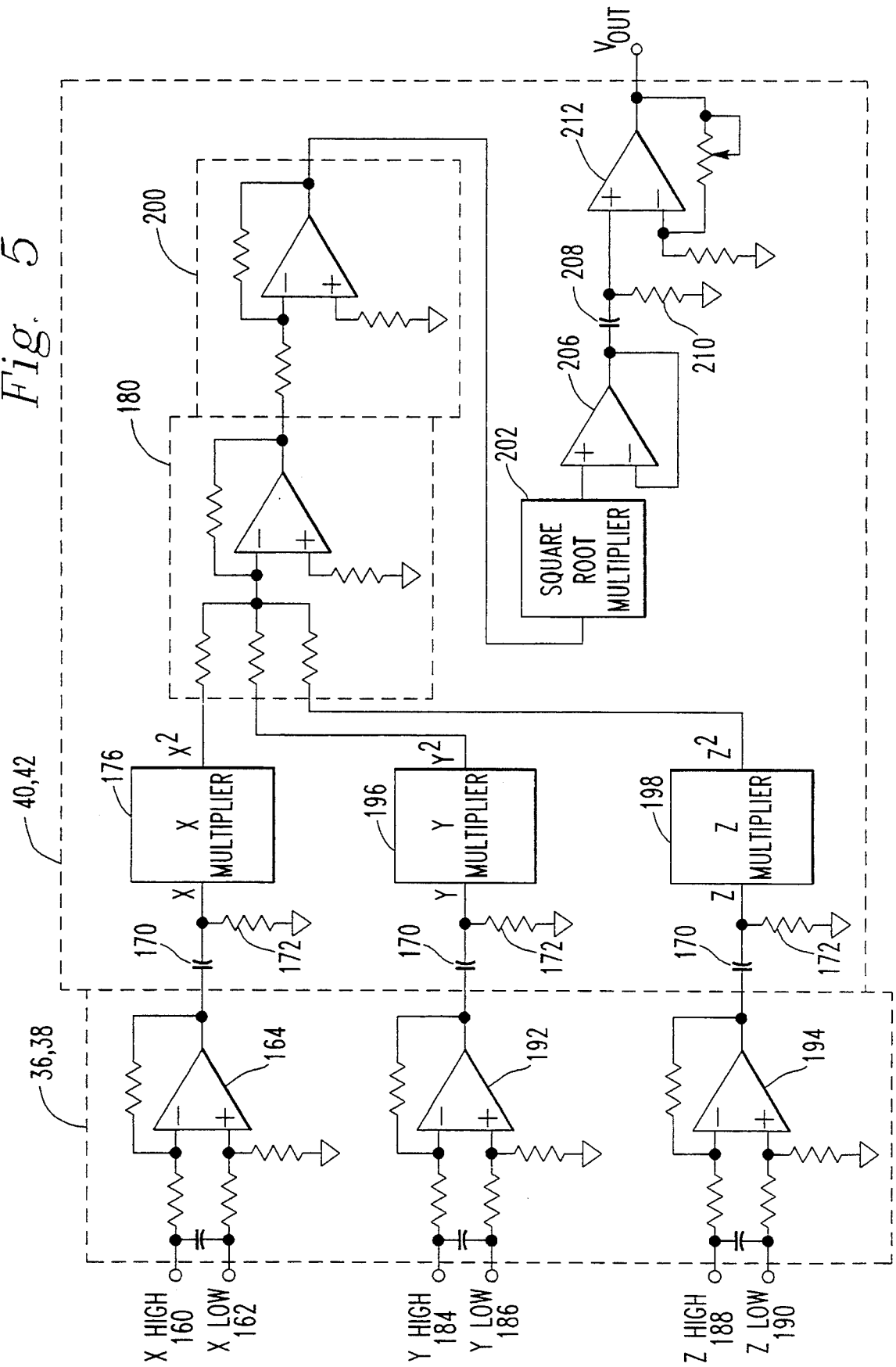
FIG. 5 is a schematic diagram illustrating the circuitry used to detect the magnetic fields and produce a root sum of squares output.

Referring now to FIG. 5, shown in a more detailed schematic diagram of first amplifying network 36 or second amplifying network 38 as well as first signal processing stage 40 or second signal processing stage 42.

Both first sensor 30 and second sensor 32 have three orthogonally configured coils which are particularly sensitive to magnetic fields aligned along each orthogonal axis. The axis of sensitivity of each coil is conveniently referred to as the X-axis, Y-axis and Z-axis. Each coil has two outputs to which sensing devices can be attached. The X-coils of the first sensor 30 are attached to two input terminals 160 and 162 of an X-pickoff amplifier 164. X-pickoff amplifier 164 is configured to sense the amount of current induced in the X-sensor coil 152.

Connected at the output of X-pickoff amplifier 164 is a first filter capacitor 170 and a first filter resistor 172. The output from first filter capacitor 170 is then fed into an X-analog multiplier 176. X-analog multiplier is configured to output an analog signal equal to the square of the signal present at its input. In the present embodiment analog multiplier is an analog device AD534. The output from X-analog multiplier 176 is then fed into a summing amplifier 180.

First amplifying network 36 also has two inputs, 184 and 186, connected to the Y-sensor coil 154 as well as two inputs, 188 and 190, connected to the Z-sensor coil. Y-high input 184 and Y-low input 186 are connected to a Y-pickoff amplifier 192 which then outputs a voltage signal indicative of the current induced in Y-sensor coil 154. Similarly, a Z-pickoff amplifier 194 is connected to Z-high input 188 and Z-low input 190 to output a signal indicative of the amount of current induced in Z-sensor coil 156. The output from Y-pickoff amplifier 192 is fed through a filter capacitor 170 and filter resistor 172 and input to a Y-analog multiplier 196. Similarly, the output from Z-pickoff amplifier 194 is fed into a filter capacitor 170 and a filter resistor 172. The output from filter capacitor 170 is then fed into a Z-analog multiplier 198. Y-analog multiplier 196 and Z-analog multiplier 198 are configured similarly to that of X-analog multiplier 176 to provide an output which is equivalent to the square of the analog voltage signal received at its input. The output from Y-analog multiplier 196 is fed to a second input of summing amplifier 180. Similarly, the output of Z-analog multiplier 198 is fed to a third input of summing amplifier 180.

Summing amplifier 180 is configured in a well known configuration to provide an analog output voltage equal to the inverse of the sum of the analog input voltages. The output of summing amplifier 180 is connected to inverting amplifier 200. Inverting amplifier 200 is configured to provide an output signal that is equivalent in magnitude to its input signal; however, having an inverse polarity.

The output of inverting amplifier 200 is then fed to the input of an analog multiplier 202. Analog multiplier 202 is configured to provide an output which is equal to the square root of the analog signal received at its input. The output of analog multiplier 202, or square root multiplier 202, is connected to a buffer amplifier 206 which has its output connected to a second filter capacitor 208. Connected at the output of filter capacitor 208 is a second resistor 210. Also connected at the output of second capacitor 208 is a gain amplifier 212. Gain amplifier 212 is configured to provide signal conditioning amplification necessary at the output stage.

The schematic diagram shown in FIG. 5 illustrates the circuitry necessary to process signals from one sensor. For example, the circuitry shown in FIG. 5 may be connected to first sensor 30 and as such, makes up portion of first amplifying network 36 and first signal processing stage 40. It is understood that second amplifying network 38 and second signal processing stage 42 are identical to first amplifying network 36 and first signal processing stage 40.

To summarize the operation of first amplifying network 36 and first signal processing 40 it is beneficial to trace through the functionality of each block. At the input of X-analog multiplier 176 the analog voltage level is indicative of the X component of a sensed magnetic field (an X-magnitude signal). At the output of first analog multiplier 176, the analog signal voltage is equivalent to the square of the X-magnitude signal. Similarly, the output of Y-analog multiplier 196 is equivalent to the square of a Y-magnitude signal and the output of Z-analog multiplier 198 has a magnitude equivalent to the square of a Z-magnitude signal. These signals are then input to summing amplifier 180 and inverting amplifier 200 to result in a signal equivalent to X squared plus Y squared plus Z squared ($X^2+Y^2+Z^2$). By inputting this signal into analog multiplier 202 results in a signal equivalent to the square root of X squared plus Y squared plus Z squared (the root sum of squares, or RSS signal)

$$(\sqrt{X^2 + Y^2 + Z^2}).$$

This signal is then available at the output of gain amplifier 212 with its DC component removed by filter network 208 and 210.

The root sum of squares signal was utilized to indicate the time at which rotating magnetic field vector 94 is encountered by first sensor 30. The root sum of squares signal (RSS signal) does not depend upon the orientation of the sensor while still being a good indicator of the presence of rotating magnetic field vector 94. This signal can then be input to microprocessor 10 for detection of the peak of the RSS signal to indicate the time at which rotating magnetic field vector encounters first sensor 30. Detection of the rotating magnetic field vector 94 by second sensor 32 is similarly accomplished.

In the present embodiment, the RSS signal is created by utilizing numerous analog components. It will be understood that an equivalent signal could be created using other methods such as a digital signal processor or a microprocessor.

Figure 6A:
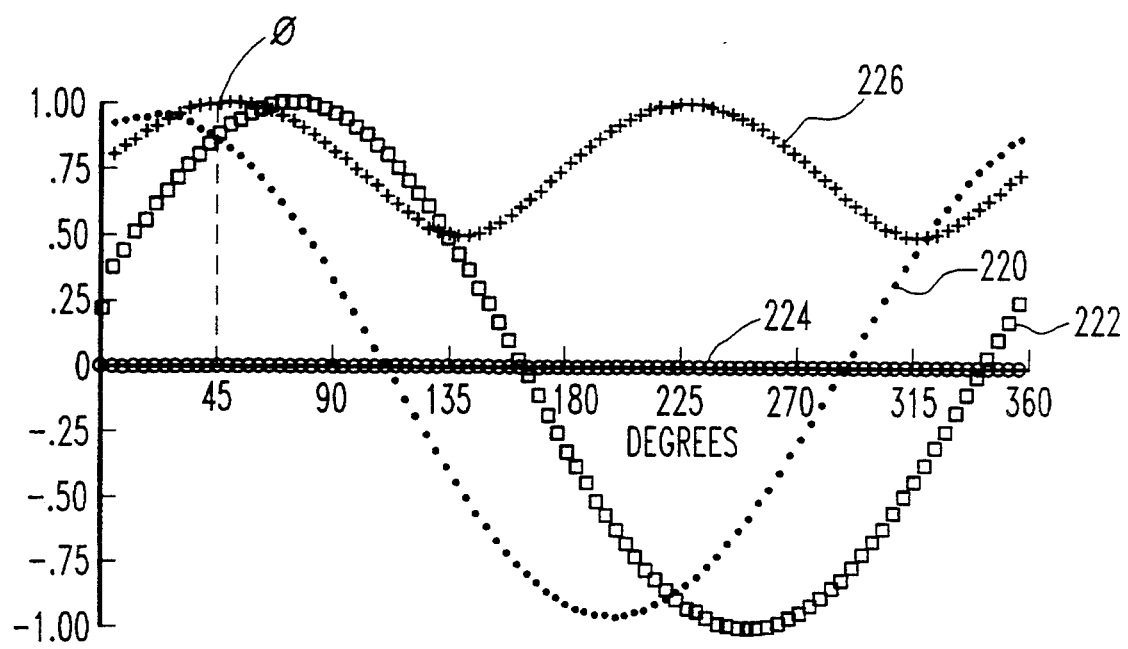
FIG. 6 is a graphical illustration showing the relationship between the signals produced by the magnetic field transmitter and the root sum of squares output.
Figure 6B:
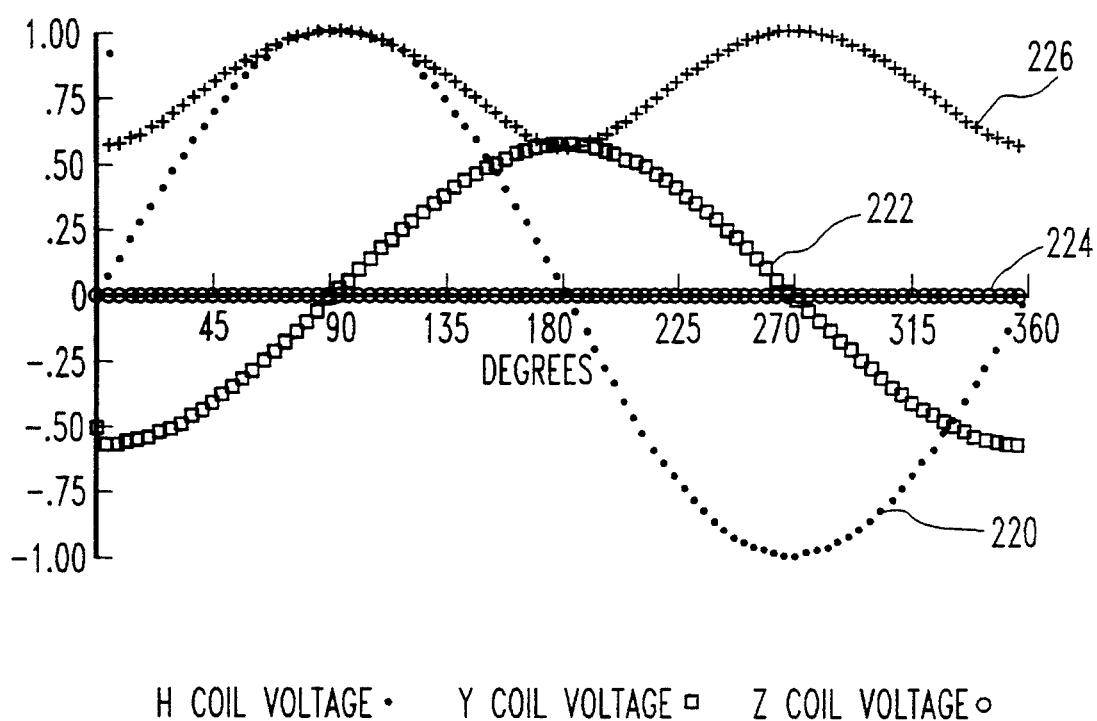
Figure 6C:
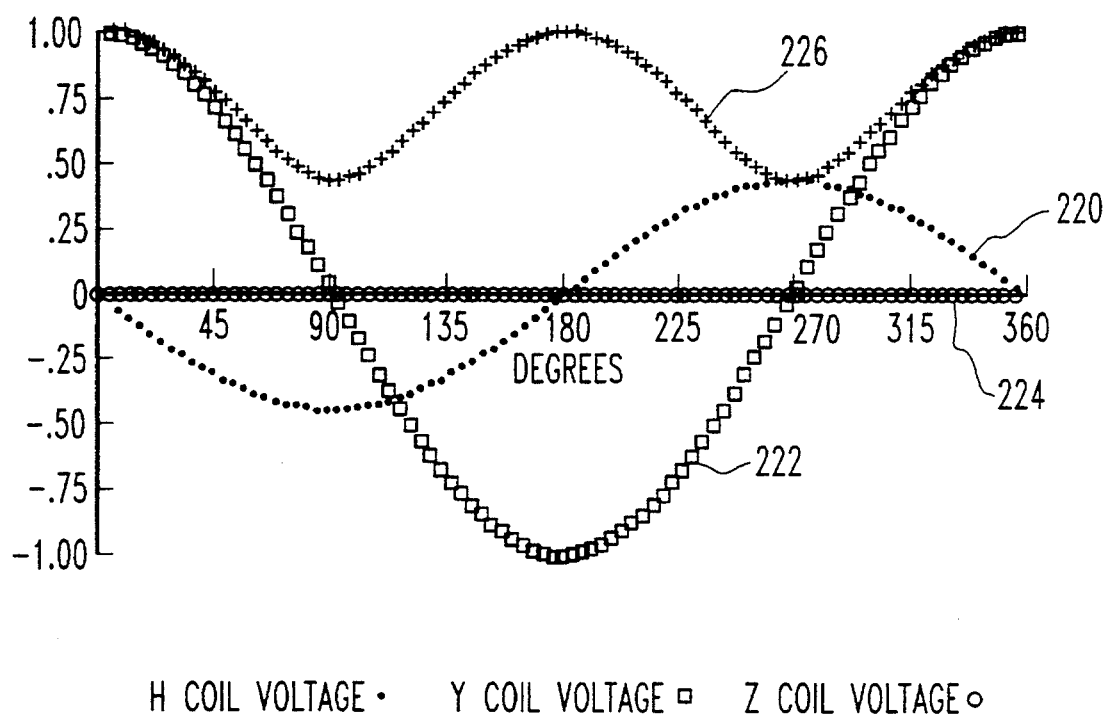

Referring now to FIGS. 6a, 6b and 6c, there are shown example waveforms which illustrate the signal relationships of the present invention. FIG. 6a illustrates the appropriate waveforms when a sensor is placed at a 45 degree angle with respect to transmitter 20 while being in the same plane. As shown in FIG. 6a, the X-coil receives a sinusoidal signal 220 while the Y-coil receives a similar sinusoidal signal 222 which is out of phase with X-signal 220. These two signals create a rotating magnetic field vector which rotates in a clockwise direction. Note that the signal received by Z-coil 224 is zero. An output signal 226 received from the signal processing network shown on FIG. 5 is illustrated with its DC component present. This signal is a root sum of squares signal received from the three sensor coils. As can be shown in FIG. 6a, the RSS signal 226 peaks at a time 45 degrees from the reference point where Y equals 0 and X equals 1.

Referring now to FIG. 6b, there is shown an illustration of appropriate waveform when the sensor is positioned directly on the X-axis. Here the reference point is chosen to be the point at which the magnetic field vector is pointing along the negative Y-axis. Here the RSS signal 226 peaks at a time equivalent to a 90 degree angle. This is consistent with what would be expected.

Referring to FIG. 6c there is shown an illustration which relates the appropriate wave forms when the sensor is positioned on the negative Y-axis. Here the reference point is chosen to be time at which the magnetic field vector 94 is direct along the positive Y-axis and the magnetic field vector 94 rotates in a clockwise direction. Note that the RSS signal 226 peaks at a time equivalent to 180 degrees.

Figure 7:
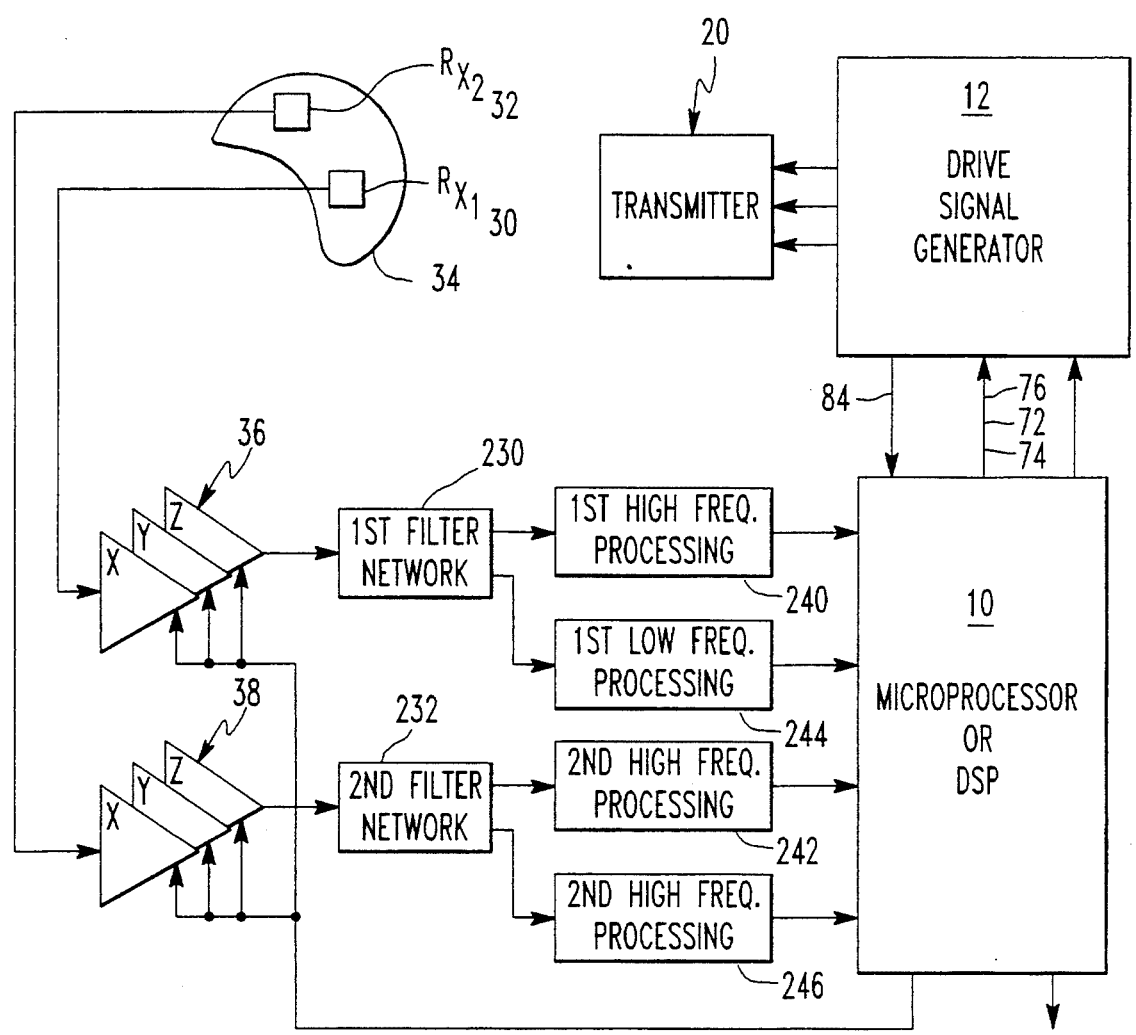
FIG. 7 is a block diagram of a second embodiment of the present invention.

Referring to FIG. 7, there is shown an alternative embodiment of the present invention. This embodiment utilizes the principles previously described; however, provides the enhancement of utilizing a multiple frequency magnetic field. (Elements remaining the same as those depicted in FIG. 1 have maintained their same reference numbers.) Again, microprocessor 10 provides a number of signals to drive signal generator 12. These signals provide drive signal generator 12 with the ability to drive the three coils (X-coil 22, Y-coil 24, and Z-coil 26) of transmitter 20. However, in this embodiment, drive signal generator 12 is loaded with drive signals containing two frequency components. Transmitter 20 would be driven by a composite signal having one low frequency component and one high frequency component. Driving the transmitter in such a way again creates rotating magnetic field vectors; however, one magnetic field vector rotates at a high frequency while a second rotating magnetic field vector rotates at a low frequency. In this embodiment, the low frequency component of the transmitter drive signal would be below the level of eddy current effects (from 30 to 100 hertz), thus eliminating some of the metal effects within a cockpit. A second component of the composite signal would run at approximately 11 Khz. The idea of using a multiple frequency transmitter signal and rotating magnetic field vectors of multiple frequencies is to continuously update the position and orientation of the receivers 30 and 32 at a very high frequency (11 Khz) while correcting the high frequency updates periodically for eddy current effects. The low frequency component is below the level at which eddy current effects create errors, thus will provide an accurate measure of position.

In order to accomplish the goal of using multiple frequency components, the signal processing and signal conditioning must be altered slightly. First receiver 30 and second receiver 32, again, sense magnetic fields which are generated by transmitter 20. These signals are then transmitted to a first amplifying network 36 and a second amplifying network 38. However, the outputs of first amplifying network 36 and second amplifying network 38 are connected to a first filtering network 230 and a second filtering network 232 for purposes of separating the different frequency components of the received signals. First filtering network 230 provides a high frequency output to a first high frequency processing stage 240, while second filtering network 232 provides a high frequency output to second high frequency processing stage 242. Similarly, first filtering network 230 provides a low frequency output to first low frequency processing 244, while second filtering network 232 provides a low frequency to second low frequency processing stage 246. All of the processing stages (first high frequency processing stage 240, second high frequency processing stage 242, first low frequency processing stage 244 and second low frequency processing stage 246) provide the necessary circuitry or processing to develop an RSS signal from the signal sensed by first receiver 30 and second receiver 32. These RSS signals are then communicated to processor 10.

While it is shown that separate processing stages are used for each frequency component of the received signals, it will be understood by those skilled in the art that numerous methods to achieve this goal exist. For example, signals could be multiplexed into a signal processing stage, or all signal processing could be carried out by a digital signal processor.

Note that other alterations may be necessary to implement this second embodiment. Specifically, filtering network 42 and 44 must be removed from the output stage of drive amplifying 78, 80 and 82. Similar filtering aspects must be similarly accounted for throughout the circuitry.

Having described the present invention in considerable detail, it is understood that certain modifications can be made to the specific detail described. We claim all modifications coming within the scope and spirit of the following claims.

What is claimed is:

1. A sensing device for determining the position and orientation of an object in a predefined space, comprising:
    a magnetic field generation means for generating a magnetic field having a rotating field vector, the field generation means situated in the predefined space at a known location and in a known orientation;
    a first sensor means for sensing the rotating field vector and generating a signal in response to the rotating field vector, the first sensor means attached to the object whose position is being sensed;
    a second sensor means for sensing the rotating field vector and generating a signal in response to the rotating field vector, the second sensor means attached to the object whose position is being sensed;
    a timing means attached to the transmitting means and the first sensor means for sensing a first time period in which the rotating field vector travels between a reference point and the first sensor means, the timing means being further attached to the second sensor means for measuring a second time period in which the rotating magnetic field vector travels between the reference point and the second sensor means; and
    a computing means for computing the position of the first sensor means based upon the first time period and for computing the position of the second sensor means based upon the second time period, the computing means for further computing the orientation of the object based upon the position of the first sensor means and the second sensor means.

2. The sensing device of claim 1 wherein the field generation means comprises a transmitting means having three orthogonal coils for generating magnetic fields having components aligned with the axis of the orthogonal coils and a drive signal generator for energizing the orthogonal coils so as to produce the rotating magnetic field vector.

3. The sensing device of claim 1 wherein the first sensor means comprises a magnetic sensor having three orthogonally situated sensor coils, in each sensor coil is induced an electrical current in the presence of a magnetic field oriented along a sensitive axis of each sensor coil, an amplifying network for sensing the electrical current induced in each of the sensor coils and producing a plurality of electrical signals indicative of the induced current, and a signal processing stage for receiving the electrical signals and producing an output electrical signal indicative of the root-sum-of-squares of the plurality of electrical signals.

4. The sensing device of claim 3 wherein the three sensor coils are an X-coil, a Y-coil, and a Z-coil.

5. The sensing device of claim 3 wherein each coil is attached to a sensing amplifier, the sensing amplifier capable of producing a voltage signal indicative of the amount of current induced in each coil by a magnetic field.

6. The sensing device of claim 1 wherein the magnetic field generation means further comprises an X-memory for storing X-waveforms, a Y-memory for storing Y-waveforms and a Z-memory for storing Z-waveforms, the X-memory having an output attached to an X-coil driving means for driving the X-coil in accordance with the stored X-waveforms, the Y-memory having an output attached to a Y-coil driving means for driving the Y-coil in accordance with the stored Y-waveforms, and the Z-memory having an output attached to a Z-coil driving means for driving the Z-coil in accordance with the stored Z-waveforms, the X-coil driving means attached to the transmitter X-coil, the Y-coil driving means attached to the transmitter Y-coil, the Z-coil driving means attached to the transmitter Z-coil.

7. A sensing device for determining the position of an object in a space, comprising:
    a transmitting means for generating a plurality of rotating magnetic field vectors which rotate at a predetermined frequency, the transmitting means situated in at a known position;
    means for sensing a magnetic field vector, the sensing means attached to the object who's position is being determined, the sensing means having an output for outputting a sensor signal indicative of the sensed magnetic fields;
    timing means for measuring a plurality of time duration required for the plurality of rotating field vectors to travel between a plurality of known reference points and the sensing means; and
    computing means for computing the position of the sensing means based upon plurality of measured time duration.

8. The sensing device of claim 7 wherein the plurality of rotating magnetic field vectors are a first rotating magnetic field vector rotating in a first plane, a second rotating magnetic field vector rotating in a second plane, and a third rotating magnetic field vector rotating in a third plane.

9. The sensing device of claim 7 wherein the transmitting means has an X-coil, a Y-coil and a Z-coil orthogonally arranged for generating the plurality of rotating magnetic field vectors.

10. The sensing device of claim 8 wherein the first plane, the second plane, and the third plane are orthogonally related.

11. The sensing device of claim 7 wherein the sensing means is a three-axis magnetic field sensor capable of producing a first signal indicative of the sensed magnetic field aligned with first sensor axis, a second signal indicative of the sensed magnetic field aligned with the second sensor axis, and a third signal indicative of the sensed magnetic field aligned with the third sensor axis.

12. The sensing device of claim 11 wherein the first signal, the second signal, and the third signal are manipulated to produce the sensor signal equivalent to the root-sum-of-squares of the first signal, the second signal, and the third signal.

13. The sensing device of claim 9 wherein the transmitting means has a memory for storing waveforms and coil driving means attached to the memory for driving the field generating coils.

14. The sensing device of claim 13 wherein the memory consists of an X-memory for storing X-waveforms, a Y-memory for storing Y-waveforms, and a Z-memory for storing Z-waveforms.

15. The sensing device of claim 14 wherein the coil driving means consists of an X-digital to analog converter attached to the X-memory and an X-driving amplifier attached to the X-digital to analog converter for driving the X-coil, a Y-digital to analog converter attached to the Y-memory and an Y-driving amplifier attached to the Y-digital to analog converter for driving the Y-coil, and a Z-digital to analog converter attached to the Z-memory and a Z-driving amplifier attached to the Z-digital to analog converter for driving the Z-coil.

16. The sensing device of claim 15 wherein the X-digital to analog converter, the Y-analog to digital converter, and the Z-analog to digital converter are multiplying digital to analog to digital converters capable of dynamically scaling their outputs.

17. A method of determining the position of an object in a space comprising the steps of:
generating a first rotating magnetic field using a magnetic field generator located at a known position, the first rotating magnetic field vector having a first magnetic field vector rotating at a predetermined frequency in a first plane;
measuring the time period required for the first magnetic field vector to travel from a known first reference point to a sensor, the sensor being attached to the object who's position is being determined;
calculating a first angle in the first plane between a vector directed from the magnetic field vector to the first known reference point and a vector directed from the magnetic field generator to the sensor;
generating a second rotating magnetic field using the magnetic field generator, the second rotating magnetic field having a second magnetic field vector rotating at a predetermined frequency in a second plane;
measuring the time period required for the second magnetic field vector to travel from a known second reference point to the sensor;
calculating a second angle in the second plane between a vector directed from the magnetic field vector to the second known reference point and a vector directed from the magnetic field generator to the sensor;
generating a third rotating magnetic field using the magnetic field generator, the third rotating magnetic field having a third magnetic field vector rotating at a predetermined frequency in a third plane;
measuring the time period required for the third magnetic field vector to travel from a known third reference point to the sensor;
calculating a third angle in the third plane between a vector directed from the magnetic field vector to the third known reference point and a vector directed from the magnetic field generator to the sensor; and
calculating the position of the object with respect to the magnetic field generator using the first angle, the second angle, and the third angle.

18. The sensing device of claim 17 wherein the computing means receives the plurality of time measurements and converts the time measurements to a plurality angles of rotation based upon the predetermined frequency of rotation.

19. The sensing device of claim 18 wherein the computing means calculates the position of the sensing means based upon the plurality of calculated angles.

20. The method of claim 17 wherein the first plane, the second plane and the third plane are orthogonal to one another.

21. A position sensing device for determining the position of a sensor in a space, comprising:
magnetic field generation means for generating a plurality magnetic fields, the plurality of magnetic fields related such that they combine to form a plurality of rotating magnetic field vectors, the magnetic field generation means further having means for producing a reference signal indicative of the time at which the plurality of rotating magnetic field vectors pass through a predefined reference point;
magnetic field receiver means for sensing the plurality of magnetic fields and providing a sensor signal indicative of the magnitude of the sensed magnetic fields;
timing means attached to the receiver means to receive the sensor signal and interpret the sensor signal to determine when the rotating magnetic field vector intersects with the receiver means, the timing means also attached to the field generation means for receiving the reference signal, the timing means for determining the time period between the reference signal and a time at which the sensor signal indicates the detection of a rotating magnetic field vector; and
computing means for determining the angular relationship between the transmitter means, the predefined reference point, and the receiver means.

22. The position sensing device of claim 21 wherein the magnetic field generation means comprises:
transmitter means having a first coil and a second coil, the first coil and the second coil being aligned normal to one another; and
drive signal generator means for generating signals to be communicated to the transmitter means, communication of the signals to the transmitter means will result in the generation of the rotating magnetic field vectors.

23. The position sensing device of claim 22 wherein the generated signals have a high frequency component and a low frequency component thus creating a high frequency rotating magnetic field vector and a low frequency rotating magnetic field vector.

24. The position sensing device of claim 23 wherein the magnetic field receiver means comprises:
a receiver having three orthogonal receiver coils;
an amplifier means for receiving induced signals from the three orthogonal coils and producing three voltage signals indicative of the magnetic field sensed by the receiver, the voltage signals each having a low frequency component as a result of the low frequency component of the transmitted signal and a high frequency component as a result of the high frequency component of the transmitted signal;

filter means for separating the low frequency component of the voltage signals from the high frequency component of the voltage signals; and signal processing means for receiving the voltage signals from the filter means and producing an RSS signal indicative of the root sum of squares of the voltage signals, whereby the RSS signal will peak when the magnetic field vector is present at the receiver.

25. The position sensing device of claim 24 wherein the timing means receives the reference signals and the RSS signals and determines the time period between the receipt of each signal.

26. The position sensing device of claim 21 wherein the transmitter means is capable of generating the plurality of magnetic fields in three orthogonal directions and is further capable of creating the plurality of rotating magnetic field vectors which rotate about three orthogonal axis.

27. The position sensing device of claim 26 wherein the plurality of magnetic fields generated signals have a high frequency component and a low frequency component thus creating a high frequency rotating magnetic field vector and a low frequency rotating magnetic field vector.

* * * * *